United States Patent [19]

Atkinson et al.

[11] Patent Number: 4,661,333
[45] Date of Patent: Apr. 28, 1987

[54] ALUMINOSILICATES

[75] Inventors: Colin Atkinson, Cheshire; Roger Brace, Merseyside; Nathan Burak, Manchester, all of England

[73] Assignee: Internationale Octrooi Maatschappij "Octropa" BV, Roterdam, Netherlands

[21] Appl. No.: 505,800

[22] Filed: Jun. 20, 1983

[30] Foreign Application Priority Data

Jun. 21, 1982 [GB] United Kingdom ............... 8217881

[51] Int. Cl.⁴ .............................. C01B 33/28
[52] U.S. Cl. .................... 423/328; 423/326; 423/327
[58] Field of Search .............. 423/326, 327, 328

[56] References Cited

U.S. PATENT DOCUMENTS

| | | | |
|---|---|---|---|
| 4,055,622 | 10/1977 | Christophliemk et al. | 423/330 |
| 4,122,031 | 10/1978 | Smith | 423/330 |
| 4,126,574 | 11/1978 | Reinwald et al. | 252/179 |
| 4,213,874 | 7/1980 | Williams et al. | 423/329 |
| 4,267,158 | 5/1981 | Christophliemk et al. | 423/328 |
| 4,275,048 | 6/1981 | Stein et al. | 423/328 |

FOREIGN PATENT DOCUMENTS

| | | |
|---|---|---|
| 2549659 | 5/1976 | Fed. Rep. of Germany . |
| 1572147 | 5/1969 | France . |
| 107428 | 8/1974 | German Democratic Rep. . |
| 1051336 | 12/1966 | United Kingdom ............... 423/328 |
| 1496977 | 1/1978 | United Kingdom . |
| 1517323 | 7/1978 | United Kingdom . |
| 1560056 | 1/1980 | United Kingdom . |
| 1560543 | 2/1980 | United Kingdom . |
| 1571539 | 7/1980 | United Kingdom . |
| 2040900 | 9/1980 | United Kingdom . |
| 2051024 | 1/1981 | United Kingdom . |
| 1587110 | 4/1981 | United Kingdom . |
| 1598042 | 9/1981 | United Kingdom . |

*Primary Examiner*—William R. Dixon, Jr.
*Assistant Examiner*—Steven Capella
*Attorney, Agent, or Firm*—Cushman, Darby & Cushman

[57] ABSTRACT

This invention provides novel amorphous aluminosilicates having useful ion exchange properties and resistance to reaction with sodium silicate when used in detergent compositions. The invention also discloses routes to manufacture of the novel aluminosilicates.

11 Claims, No Drawings

ALUMINOSILICATES

BACKGROUND OF THE INVENTION

This invention relates to aluminosilicates, more particularly to amorphous sodium aluminosilicates of especial use in detergent compositions.

It has been known for many years that aluminosilicates are useful in removing hardness ions from aqueous systems and, more recently, a large number of patent specifications have been published concerning various crystalline and amorphous aluminosilicate-containing detergent compositions. In these compositions the aluminosilicate is intended to replace, in part or in whole, the phosphate compositions which have hitherto been used.

The zeolites, or crystalline aluminosilicates, have long been known and are relatively stable materials which readily remove calcium ions from aqueous systems. The preferred type "A" zeolites do not, however, have a very significant effect on magnesium ions and it has previously been noted that amorphous aluminosilicates have the benefit of removing both calcium and magnesium ions from aqueous systems.

However, known amorphous aluminosilicates have one significant defect, namely that they react with sodium silicate, which is an important constituent of most detergent compositions. The mechanism of the reaction between amorphous aluminosilicate and sodium silicate is not fully understood, but its effect is to lessen the effectiveness of the aluminosilicate as a detergent builder in that it slows down the removal of hardness ions and may also reduce the capacity of the aluminosilicate for such ions.

Efforts have been made to overcome this deficiency in amorphous aluminosilicates by modifying the production process of detergent compositions containing these two materials. For example, British Patent Specification No. 2 013 707 suggests an alternative route for manufacturing detergent compositions in which the sodium silicate is added to the detergent composition in such a way as to minimise the reaction between the sodium silicate and the sodium aluminosilicate.

SUMMARY OF THE INVENTION

It is a principal aim of the present invention to provide an amorphous aluminosilicate which can be used in the preparation of detergent compositions, using orthodox spray-drying equipment and not requiring special techniques to prevent the interaction between the sodium silicate and amorphous sodium aluminosilicate. A further aim is the production of such an amorphous aluminosilicate in a particle size which preferably is such that it can be used in detergent compositions without further size reduction and, also, in a sufficiently high solids content that excessive quantities of water do not have to be removed from the aluminosilicate and, hence, from a detergent slurry composition containing the aluminosilicate, making it commercially less attractive.

Another aim of the invention is the preparation of a stable slurry of the aluminosilicate in the presence of suitable dispersing agents and the production of size reduced aluminosilicate by grinding or milling a slurry of aluminosilicate and dispersing agent.

Accordingly, the present invention provides an amorphous hydrated sodium aluminosilicate of chemical composition calculated on an anhydrous basis:

0.8–1.4 $Na_2O:Al_2O_3$:2.2–3.6 $SiO_2$, having, calculated on a dry basis, a calcium ion-exchange capacity greater than 100 mg CaO/g, a magnesium capacity greater than 50 mg MgO/g, an average particle size in the range 2 to 20 $\mu$m, and the ability to form a filter cake having a solids content in the range 35–50%, in a filter press with a closing pressure of 5.62 kg/cm$^2$, which filter cake can be converted into a pumpable slurry in said solids range, and having a silicate resistance (as hereinafter defined) such that the second order rate constant $k_s$ for the calcium exchange process is greater than 0.2° H$^{-1}$ min$^{-1}$ and a residual water hardness after 10 minutes of less than 1.5° H and which after drying at 50° C. to 80% solids has a rate constant $k_d$ (as hereinafter defined) greater than 0.42° H$^{-1}$ min$^{-1}$ and a residual water hardness after 10 minutes of less than 1° H.

References to °H in this specification and claims are to French degrees hardness defined as:

1° H Ca = 10$^{-4}$ molar Ca$^{++}$.

Preferably the amorphous hydrated sodium aluminosilicate has a chemical composition of:

0.8–1.4 $Na_2O:Al_2O_3$:2.4–3.2 $SiO_2$ and may optionally contain an inert soluble salt such as sodium sulphate.

The calcium and magnesium ion-exchange capacities are determined as follows.

Sodium aluminosilicate (equivalent to 1.00 g anhydrous solids determined as the residue after heating to constant weight at 700° C.) is added to 1 liter of 5.0×10$^{-3}$ M CaCl$_2$ solution and stirred for 15 minutes at 20° C. The aluminosilicate is then removed by millipore filtration and the residual calcium concentration (X×10$^{-3}$ M) of the filtrate is determined by complexometric titration or atomic absorption spectrophotometry.

The calcium exchange capacity is calculated as 56(5.0−X) mg CaO/g aluminosilicate.

Magnesium ion-exchange capacity is measured in a similar fashion using a 5×10$^{-3}$ M MgCl$_2$ stock solution and a pH in the range 9.5–10.5.

To quantify the water softening performance of the sodium aluminosilicates provided by this invention and to compare them with known amorphous aluminosilicates and the known zeolites, the following test is used.

The test is designed to simulate some of the conditions which prevail when sodium aluminosilicate is used in a detergent system.

The response of a Radiometer calcium ion specific electrode is determined by the addition of aliquots (0–20 mls) of calcium chloride (3×10$^{-2}$ M) to a solution of 5 mls M NaCl in 175 mls of water at 50° C. The resulting solution is 0.025 M in Na$^+$ and 3×10$^{-3}$ M in Ca$^{++}$. To this is added sufficient aluminosilicate to give 2.5 g/liter (anhydrous basis) and stirring is maintained throughout the water softening measurement. The electrode response is measured over the next 10 minutes and, using the calibration data, is calculated as Ca$^{++}$ concentration (°H) versus time. Water softening may be conveniently summarised by the hardness remaining after 1 and 10 minutes.

The electrode test is applied to filter cake, dried powders and to the slurries produced by the silicate resistance test.

To test the resistance of the various aluminosilicates to sodium silicate a sample of the aluminosilicate under test is mixed with sodium silicate, sodium sulphate and water to form a homogeneous slurry having the composition:

Sodium aluminosilicate: 22.5 parts (anhydrous basis)
Sodium sulphate: 11.0 parts (anhydrous basis)
Sodium silicate $Na_2O:3.4SiO_2$:6.0 parts (38% liquor)
Water*: 51.0 parts
* Including the water contained in the aluminosilicate filter cake or powder sample.

A sample of this slurry is tested for water softening activity by the calcium ion specific electrode method, allowance being made for the fact that 4.0 grams of slurry contains 1.0 g of aluminosilicate (anhydrous basis). The slurry is heated at 80° C. for 1 hour in a water bath and the electrode measurement repeated on the further sample. Differences in the two water softening measurements indicate the adverse interaction between the components. For convenience this can be summarised in terms of the calcium hardness values attained in 1 and 10 minutes.

If the aluminosilicate sample is of very low solids, eg less than 30%, or if extra water must be added to the mix to enable a fluid slurry to be produced, the test may still be performed provided allowance is made when weighing samples for the ion-exchange measurement.

The water softening kinetics involved in the determination of the rate constant k involve the use of data obtained using the calcium ion specific electrode as described above.

The water softening curve, °H Ca versus time (minutes), is summarised by a second order rate equation of the form:

$$-dCa/dt = k(Ca - Ca_{eq})^2$$

which on integration becomes:

$$Ca = \frac{1}{kt + \left(\frac{1}{Ca_o - Ca_{eq}}\right)} + Ca_{eq}$$

where
$Ca_o$ is the initial hardness, (30° H);
$Ca_{eq}$ is the equilibrium hardness at $t=\infty$;
k is the rate constant having dimensions of minute$^{-1}$° H Ca$^{-1}$;
$k_s$ is the rate constant for exchange after the silicate treatment;
$k_d$ is the rate constant for the filter cake or stabilised slurry dried in the absence of silicate;
t is the time in minutes.

A convenient method of evaluating these constants in the case where exchange is virtually complete in 10 minutes is to select the hardness remaining after 1 minute and 10 minutes and solve the equation.

$$Ca_{1\ min} - Ca_{10\ min} = \frac{1}{k + 0.03} - \frac{1}{10k + 0.03}$$

This contains the approximation that $Ca_o - Ca_{eq} = 30$ (i.e. $Ca_{eq} = 0$), but in practice this does not significantly affect the result.

The equilibrium hardness is determined from:

$$Ca_{eq} = Ca_{1\ min} - \frac{1/k}{1 + 1/30\ k} \text{ or } Ca_{10\ min} - \frac{1/k}{10 + 1/30\ k}$$

In situations where it is evident that significant exchange is still occurring after 10 minutes, albeit slowly, the test period should be extended until virtually no further exchange is occurring and a measured value of Ca equilibrium can be obtained. The k value can then be determined from the above equilibrium hardness equation.

The most effective sodium aluminosilicates for use according to this invention have a rate constant $k_s$ greater than 2 and an equilibrium calcium concentration ($Ca_{eq}$) less than 1° H after silicate treatment.

This invention also provides a process for the preparation of the novel amorphous aluminosilicates, which will yield, economically, a filter cake of relatively high solids content containing an aluminosilicate at a particle size suitable for inclusion in detergent compositions and having the benefits of silicate resistance previously spelt out.

Accordingly, the present invention provides a process for the preparation of amorphous aluminosilicate as previously defined, in which aqueous sodium silicate, having a composition $Na_2O$ 2–4 $SiO_2$ and a concentration in the range 1–4 moles/liter $SiO_2$; an aqueous aluminate having a composition 1–2 $Na_2O$ $Al_2O_3$ and a concentration in the range 0.5 to 2.0 moles/liter $Al_2O_3$, are intimately mixed together at a temperature of up to 45° C. in a mixing device to produce a sodium aluminosilicate composition which is immediately subjected to high shear in a disintegrator to produce a particle size of aluminosilicate less than 20 μm and subsequently aged.

DETAILED DESCRIPTION

The intimate mixing of the aluminate and silicate solutions can conveniently be achieved using a mixer such as that described in Handbook of Chemical Engineering by Perry & Chilton, 5th Edition, Chapter 21, ref 21-4, under the heading "Jet Mixers".

The objective of such mixers is to ensure a rapid and intimate mixing of the two solutions.

This is achieved by applying a positive pressure, for example, by pumping each of the solutions and forcing one through a small nozzle or orifice into a flowing stream of the other solution.

Suitable disintegrators for use in reducing the particle size of the sodium aluminosilicate include devices designed to impart high shear, such as the Waring blender supplied by Waring Products Division, Dynamics Corporation of America, New Hartford, Conn., USA, and Greaves SM mixer, as supplied by Joshua Greaves & Sons Limited, Ramsbottom, Lancashire, England. Various other devices can be used but it is believed that where the shear is provided by rotation of a stirrer blade in the reaction mixture, no such device will be satisfactory unless the tip speed of the rotor exceeds 300 m/min. Preferably the tip speed is in the range 1000–3000 m/min.

The processing subsequent to the high shear treatment can comprise an ageing step for the free-flowing slurry which typically extends for a period of 1–2 hours, but can be longer. The precipitate formation and ageing can take place in the presence of an inert salt such as sodium sulphate. The aged slurry can also be treated with a dilute mineral acid such as sulphuric acid to reduce its pH to about 10.0 or 11.0 prior to washing and filtering.

In order that the invention may be more clearly understood, the following examples of the invention and comparative experiments indicating the products of some prior art were carried out.

Using the Waring blender the following general method of preparation was followed. 5 liters of aluminate and silicate were prepared by adjusting commercial liquors to suitable concentration and temperature. These were each pumped at 0.5 liter/min to a mixing device (jet) and the resultant stream passed through a vessel of 4 liter capacity where it was subjected to intense agitation. The volume of product in the stirred reactor was maintained around 2 liters by adjusting overflow rate. The reaction product was collected and allowed to age, with mild agitation, for typically 2 hours before the aluminosilicate was recovered on a filter and washed free of the alkaline reaction liquor.

The filter cake may be processed so as to produce a stable, pumpable aqueous suspension by incorporating a suitable dispersing agent and optionally reducing the particle size of the aluminosilicate by milling or grinding the aluminosilicate in an aqueous medium containing the said dispersing agent, all in accordance with the teaching of British Patent Specification No 1 051 336.

Additionally, the filter cake, or the suspension as prepared above, can be converted into dry powder form by a variety of drying techniques. In order to preserve the ion exchange properties it is important that the residual moisture content (loss on ignition) is not less than about 20% by weight. Filter cakes can be conveniently dried in an oven at a temperature of 50° C. for the purpose of testing the preservation of the ion exchange properties and the determination of the $k_d$ value.

In Table I there is set out data concerning the Examples of the invention and comparative Experiments. Under the heading "Agitation" reference is made to the intense stirring devices used. Intense stirring is required to (a) prevent gelation which would lead to low solids content filter cakes and (b) control the particle size of the aluminosilicate. For these examples either a Waring blender (Model CB 6 "1 gallon capacity") or a Greaves SM mixer was used.

They both have high speed impellers, about 13000 rpm and about 3000 rpm respectively, producing tip speeds of about 2800 and 1975 m/min.

The Greaves mixer employed has a vessel capacity of 30 liters. The reagent feed rate was 7 liters/min and the product volume residing in the vessel during the run was 17 liters.

TABLE I

|  | Example 1 | Example 2 | Example 3 |
|---|---|---|---|
| Aluminate composition | 1.47 $Na_2O:Al_2O_3$ in 0.5 M $Na_2SO_4$ | 1.51 $Na_2O:Al_2O_3$ | 1.42 $Na_2O:Al_2O_3$ |
| Silicate composition | $Na_2O:3.45\ SiO_2$ in 0.5 M $Na_2SO_4$ | $Na_2O:2.6\ SiO_2$ | $Na_2O:3.56\ SiO_2$ |
| Reaction Mixture (moles) | | | |
| $Na_2O$ | 2.2 | 2.4 | 2.1 |
| $Al_2O_3$ | 1.0 | 1.0 | 1.0 |
| $SiO_2$ | 2.5 | 2.4 | 2.35 |
| $H_2O$ | 255 | 111 | 74 |
| $Na_2SO_4$ | 2.4 | — | — |
| Reaction temperature (°C.) | 25 | 25 | 25 |
| Agitation | Waring | Waring | Waring |
| Filter cake solids | 35.7 | 41.8 | 38.5 |
| Average particle size (μm) | 2.8 | 6.4 | 6.4 |
| Composition of NAS | 1.0 $Na_2O:Al_2O_3:2.6\ SiO_2$ | 1.1 $Na_2O:Al_2O_3:2.6\ SiO_2$ | 1.2 $Na_2O:Al_2O_3:3.0\ SiO_2$ |
| Ion exchange performance - Ca electrode method (°HCa) | | | |
| Filter cake activity (1/10 min) | 0.2/0.2 | 0.5/0.4 | 0.4/0.3 |
| Silicate test | | | |
| (1 min/10 min) | 1.5/0.19 | 4.1/1.2 | 0.8/0.7 |
| ($k_s$ value) | 1.65 | 0.28 | >5 |
| Drying test | | | |
| (1 min/10 min) | 0.5/0.4 | 0.4/0.3 | 0.4/0.4 |
| ($k_d$ value) | 6.4 | >10 | >10 |
| Ca capacity (mgm CaO/gm) | 141 | 137 | 159 |
| Mg capacity (mgm MgO/gm) | 68 | 58 | 86 |

|  | Example 4 | Example 5 | Experiment 1 | Experiment 2 |
|---|---|---|---|---|
| Aluminate composition | 1.51 $Na_2O:Al_2O_3$ in 0.5 M $Na_2SO_4$ | 1.4 $Na_2O:Al_2O_3$ | 1.5 $Na_2O:Al_2O_3$ | 1.5 $Na_2O:Al_2O_3$ |
| Silicate composition | $Na_2O:3.41\ SiO_2$ in 0.5 M $Na_2SO_4$ | $Na_2O:3.32\ SiO_2$ | $Na_2O:3.4\ SiO_2$ | $Na_2O:3.4\ SiO_2$ |
| Reaction Mixture (moles) | | | | |
| $Na_2O$ | 2.2 | 2.1 | 2.3 | 2.3 |
| $Al_2O_3$ | 1.0 | 1.0 | 1.0 | 1.0 |
| $SiO_2$ | 2.4 | 2.3 | 2.3 | 2.3 |
| $H_2O$ | 110 | 54 | 75 | 140 |
| $Na_2SO_4$ | 1.0 | — | — | — |
| Reaction temperature (°C.) | 25 | 30 | 25 | 25 |
| Agitation | Waring | Greaves | Silverson | Silverson |
| Filter cake solids | 39.0 | 48.4 | 45.9 | 47.0 |
| Average particle size (μm) | 4.9 | 11.8 | 7.7 | 4.2 |
| Composition of NAS | 1.1 $Na_2O:Al_2O_3:2.8\ SiO_2$ | 1.0 $Na_2O:Al_2O_3:2.6\ SiO_2$ | — | — |
| Ion exchange performance - Ca electrode method (°HCa) | | | | |
| Filter cake activ (1/10 min) | 0.2/0.2 | 0.5/0.3 | 0.3/0.2 | 0.3/0.2 |
| Silicate test | | | | |
| (1 min/10 min) | 1.0/0.9 | 4.0/0.5 | 8.4/0.3 | 10.7/1.5 |
| ($k_s$ value) | >5 | 0.22 | 0.08 | 0.065 |

TABLE I-continued

| Drying test | | | | |
|---|---|---|---|---|
| (1 min/10 min) | 0.4/0.3 | 0.8/0.2 | 24/14 | 0.6/0.2 |
| ($k_d$ value) | >10 | 1.54 | 0.06 | 2.1 |
| Ca capacity (mgm CaO/gm) | 151 | 158 | — | — |
| Mg capacity (mgm CaO/gm) | 72 | — | — | — |

Comparative Experiments 1 and 2 in Table 1 illustrate the products of the two prior processes, and employed an alternative high shear, Silverson mixer model L2R, which was found more practically suitable to these processes.

EXPERIMENT 1

This experiment follows the general teaching of British Patent No. 1 232 429 to Swiss Aluminium and involves the slow addition of silicate to aluminate.

The product has good ion-exchange properties but is affected by silicate as can be seen in Table I and is very sensitive to drying.

EXPERIMENT 2

A further experiment involving the simultaneous metering of silicate and aluminate to the high shear zone of a reaction vessel produced a material with high solids filter cake and good ion-exchange. The aluminosilicate could be dried but was badly affected by silicate as can be seen in Table I.

This experiment illustrates the problem if the reagents are not first intimately mixed with each other in a jet mixer or similar device.

We claim:

1. An amorphous hydrated sodium aluminosilicate of chemical composition calculated on an anhydrous basis:
   0.8–1.4 $Na_2O:Al_2O_3$:2.2–3.6 $SiO_2$,
having, calculated on a dry basis, a calcium ion-exchange capacity greater than 100 mg CaO/g, a magnesium capacity greater than 50 mg MgO/g, an average particle size in the range 2 to 20 μm, and the ability to form a filter cake having a solids content in the range 35–50%, in a filter press with a closing pressure of 5.62 kg/cm$^2$, which filter cake can be converted into a pumpable slurry in said solids range, and having a silicate resistance (as hereinbefore defined) such that the second order rate constant $K_s$ for the calcium exchange process is greater than 0.2° $H^{-1}$ min$^{-1}$ and a residual water hardness after 10 minutes of less than 1.5 °H and which after drying at 50° C. to 80% solids has a rate constant $k_d$ (as hereinbefore defined) greater than 0.42° $H^{-1}$ min$^{-1}$ and a residual water hardness after 10 minutes of less than 1° H, said aluminisilicate being suitable for use at relatively high solids content in detergent compositions containing sodium silicate and being further characterized by its resistance to reaction with sodium silicate in such detergent compositions.

2. An amorphous hydrated sodium aluminosilicate as claimed in claim 1 in which the chemical composition is: 0.8–1.4 $Na_2O:Al_2O_3$:2.4–3.2$SiO_2$.

3. A process for the preparation of amorphous aluminosilicate as claimed in claim 1, in which aqueous sodium silicate, having a composition $Na_2O$ 2–4 $SiO_2$ and a concentration in the range 1–4 moles/liter $SiO_2$; and aqueous aluminate having a composition 1–2 $Na_2O$ $Al_2O_3$ and a concentration in the range 0.5 to 2.0 moles/liter $Al_2O_3$, are intimately mixed together at a temperature in the range 15°–45° C. in a mixing device to produce a sodium aluminosilicate composition which is immediately subjected to high shear in a disintegrator to produce a particle size of aluminosilicate less than 20 μm and subsequently aged in aqueous slurry for at least one hour.

4. A process as claimed in claim 3, in which the aluminate and/or the silicate solutions contain an inert soluble salt.

5. A process as claimed in claim 3, in which the amorphous aluminosilicate is separated from the aqueous solution from which it was formed to yield a cake having greater than 35% solids.

6. A process as claimed in claim 5 in which the filter cake is dried to form a dried composition which can be redispersed into a slurry.

7. A process as claimed in claim 5 in which the filter cake is mixed with a dispersing agent and re-slurried to produce a pumpable suspension.

8. A process as claimed in claim 3, in which the aluminosilicate is mixed with a dispersing agent and its particle size is reduced by milling or grinding.

9. A process as claimed in claim 8 in which the aluminosilicate and dispersing agent slurry is dried to form a dry aluminosilicate composition which can be redispersed into an aqueous pumpable slurry.

10. An amorphous hydrated sodium aluminosilicate comprising an effective amount of a dispersing agent prepared by a process as claimed in claim 9.

11. An amorphous hydrated sodium aluminosilicate as claimed in claim 10, comprising an inert soluble salt.

* * * * *